April 18, 1950  R. O. MONROE ET AL  2,504,863

VALVE STEM CONSTRUCTION

Filed July 15, 1944

Inventors
ROLLO O. MONROE and
JOHN W. HIERONYMUS
By Beaman & Langford
Attorneys

Patented Apr. 18, 1950

2,504,863

UNITED STATES PATENT OFFICE 2,504,863

VALVE STEM CONSTRUCTION

Rollo O. Monroe and John W. Hieronymus, Three Rivers, Mich., assignors to The Johnson Corporation, Three Rivers, Mich., a corporation of Michigan Application July 15, 1944, Serial No. 545,029

1 Claim. (Cl. 251—103)

The present invention relates to improvements in valve stem constructions.

One of the objects of the invention is to provide a sealed valve stem structure and assembly characterized by its free rotatability under extreme service conditions.

Another object is to provide a valve stem assembly having an improved seal.

A still further object resides in providing an improved valve stem assembly in which a carbon graphite ring is employed to seal the stem in its support with means for resiliently urging the sealing surface of the valve stem into engagement with the carbon graphite sealing ring.

These and other objects and advantages residing in the construction, arrangement and combination of parts will become more apparent from a consideration of the follownig specification and annexed claim.

Figure 1:
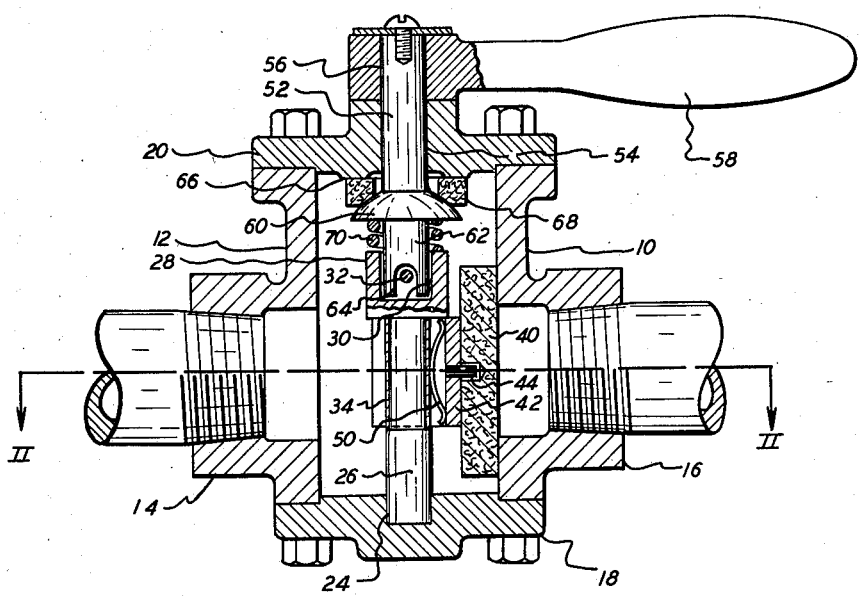
Fig. 1 is a vertical cross-sectional view taken on line I—I of Fig. 2.
Figure 2:
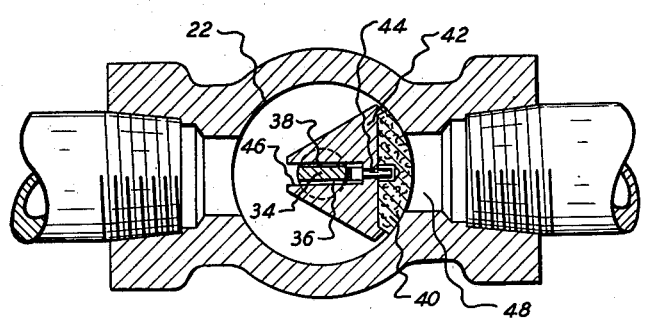
Fig. 2 is a horizontal cross-sectional view taken on line II—II of Fig. 1.

The principles of construction of the present invention have been illustrated in connection with a valve 10 having a cast main body portion 12 with an inlet connection 14 and an outlet connection 16. Plates 18 and 20 close the upper and lower ends of the bore 22.

The plate 18 has a recess 24 in which the shaft 26 is received at its lower end. The upper end 28 of the shaft 26 is recessed at 30 and carries a cross pin 32. The central portion 34 of the shaft 26 is of reduced cross section having parallel sides 36 and 38. The molded carbon graphite sealing block 40 is floated on the support 42 through a pin 44. The support 42 is slotted at 46 to receive the reduced portion 34 of the shaft 26, being horizontally slidable relative thereto and constituting a driving connection between the shaft 26 and the support 42. For resiliently urging the sealing block 40 against the wall of the bore 22 which defines a seat surrounding the outlet 48, a spring 50 is inserted in the slot 46 and is in a position to react against the reduced portion 34.

The specific construction of the valve just described constitutes no part of the present invention, being the subject matter of our copending application Serial No. 545,028, filed July 15, 1944, now Patent No. 2,422,796, issued June 24, 1947.

Our improved valve stem assembly, which may be employed for the rotation of valve parts other than that illustrated, consists of a shaft portion 52 extending through a bore 54 in the plate 20.

The shaft 52 may be square to be received in a similarly shaped hole 56 in the handle 58. Shown integral with the shaft 52 is a spherical segment 60 below which extends the driver portion 62 which is forked at 64 to receive the drive pin 32.

The underside of the plate 20 is provided with a machined boss 66 surrounding the bore 54. The seal of the shaft 52 is preferably in the form of a carbon graphite ring 68 having upper and lower surfaces complementary with the surface of the boss 66 and the spherical segment 60.

A coil spring 70 acting between the upper end of the shaft 26 and the underside of the spherical segment 60 resiliently urges the valve stem assembly upwardly to effect the seal between the sealing ring 68 and the surfaces associated therewith. The pin and slot connection defined by the parts 32 and 64 permit relative axial movement of the valve stem to compensate for wear that may take place in the carbon graphite ring 68.

It will also be understood that fluid pressure within the valve 10 will act in conjunction with the spring 70 to bring the surfaces of the parts 60 and 62 into sealing engagement with the corresponding complementary surfaces of the sealing ring 68. It should be apparent that the valve stem construction herein described necessitates a minimum amount of machining in its construction. It will be further appreciated that even under extremely high pressures and temperatures very little effort will be required to partially or completely rotate the shaft 52.

Having thus described our invention, what we claim as new and desire to cover by Letters Patent is:

In a valve construction, a hollow casing structure, said casing structure comprising a side wall with a port opening and upper and lower opposed end walls, said upper end wall having a bore extending therethrough and said lower wall having a socket defined in its inner surface, a two-part shaft, said shaft comprising an upper portion rotatably mounted in said bore and a lower portion rotatably journalled in said socket, said shaft portions being in substantial axial alignment and having opposed ends located within the casing interior, a cup portion at one said opposed shaft end, a cross pin in said cup, a fork at the other opposed shaft end, said latter being socketed within said cup with its fork positioned over said cross pin, said cup providing all-round clearance with said forked shaft end to permit limited transverse movement of the upper shaft portion relatively to the lower shaft portion and said pin and fork connection permitting limited relative axial movement of the thus jointed shaft assembly to take place, a valve member on said lower shaft portion in position to control the opening and closing of said casing port opening by appropriate rotation of said jointed shaft assembly, an enlargement on said upper shaft portion having an upper spherical surface and a lower shoulder surface, a compression spring embracing said upper shaft portion and acting against said shoulder surface, and a sealing ring encircling said upper shaft portion and located between said upper spherical surface and the inside surface of said upper casing end wall, said sealing ring having a lower spherical surface recess and said spring urging said upper spherical surface into engagement with said spherical surface recess, said sealing ring loosely providing an all-round clearance with respect to said upper shaft portion whereby said sealing ring is permitted to adjust itself in the plane of the inside surface of said upper casing end wall.

ROLLO O. MONROE.
JOHN W. HIERONYMUS.

REFERENCES CITED

The following references are of record in the file of this patent:

UNITED STATES PATENTS

| Number | Name | Date |
| --- | --- | --- |
| 807,981 | Whittaker | Dec. 19, 1905 |
| 854,698 | Martell | May 21, 1907 |
| 1,871,072 | Miller | Aug. 9, 1932 |
| 2,150,080 | Pollock | Mar. 7, 1939 |

FOREIGN PATENTS

| Number | Country | Date |
| --- | --- | --- |
| 9,952 | Great Britain | of 1902 |
| 21,014 | Great Britain | of 1914 |